United States Patent [19]

Resch

[11] 4,083,269
[45] Apr. 11, 1978

[54] TOOL FOR STRIPPING THE INSULATION FROM ELECTRICAL CONDUCTORS

[75] Inventor: Alois Ruppert Resch, Heilbronn, Germany

[73] Assignee: Bunker Ramo Corporation, Oak Brook, Ill.

[21] Appl. No.: 675,811

[22] Filed: Apr. 12, 1976

[30] Foreign Application Priority Data

Apr. 15, 1975 Germany ............................ 2516499

[51] Int. Cl.² .............................................. H02G 1/12
[52] U.S. Cl. ...................................................... 81/9.51
[58] Field of Search ..................... 81/9.51, 9.5 A, 9.5 R

[56] References Cited

U.S. PATENT DOCUMENTS

| 2,285,167 | 6/1942  | Montgomery ..................... 81/9.51 |
| 3,222,957 | 12/1965 | Kramer et al. ..................... 81/9.51 |
| 3,292,462 | 12/1966 | Turecek et al. .................... 81/9.51 |
| 3,541,896 | 11/1970 | Watson ............................... 81/9.51 |

FOREIGN PATENT DOCUMENTS

| 187,161   | 10/1956 | Germany ........................... 81/9.51 |
| 1,209,761 | 10/1970 | United Kingdom .............. 81/9.51 |
| 609,834   | 10/1948 | United Kingdom .............. 81/9.51 |

*Primary Examiner*—James L. Jones, Jr.
*Assistant Examiner*—Roscoe V. Parker
*Attorney, Agent, or Firm*—William Lohff; F. M. Arbuckle

[57] ABSTRACT

A tool for stripping the insulation from electrical conductors. A clamping device is provided to clamp the conductor, two blades are supported by a carriage movable relative to the clamping device, and a motor-driven control system is used to transfer both the clamping device and the blades from a position in which the conductor is released to a working position in which the conductor is clamped. The blades cut into the insulation with the carriage moved so that the cut insulation is stripped by the blades in the working position, and then the clamping device and the blades are returned into the position in which the conductor is released after stripping the insulation.

7 Claims, 8 Drawing Figures

TOOL FOR STRIPPING THE INSULATION FROM ELECTRICAL CONDUCTORS

BACKGROUND OF THE INVENTION

The present invention relates to a tool for stripping the insulation from electrical conductors, comprising two blades which are movable toward each other for cutting the insulation of the conductor.

Tools for stripping the insulation from electrical conductors are known, but the design of such tools is usually rather complicated, and therefore the production of the tools is expensive. The tools, which are usually operated with compressed air, are suitable only for certain serial operations in large production plants in which full use is made of the capacity of the tools and in which more than 1000 stripping operations are to be performed per hour. The purchase of a tool of this type is usually not advantageous for small shops in view of economic considerations.

The goal of the present invention is to create a stripping tool of simple design so that the tool can be produced at low cost and hence can be employed also by small shops or in do-it-yourself work.

SUMMARY OF THE INVENTION

According to the subject invention, there is provided a clamping device to clamp the conductor, two blades are supported by a carriage movable relative to the clamping device, and a motor-driven control system is used to transfer both the clamping device and the blades from a position in which the conductor is released to a working position in which the conductor is clamped. The blades cut into the insulation with the carriage moved so that the cut insulation is stripped by the blades in the working position, and then the clamping device and the blades are returned into the position in which the conductor is released after stripping the insulation.

The tool of the subject invention permits automatic stripping of the insulation from a conductor which is inserted into the tool, remains clamped in it, and is released after the stripping operation.

The design of the tool is relatively simple. The tool makes use of a device clamping the conductor and of a carriage which is movable relative to the clamping device and which supports the two blades cutting the insulation. Both the clamping device and the blades are transferred by a motor from a releasing position to a working position and thereafter returned into the releasing position.

BRIEF DESCRIPTION OF THE DRAWINGS

The subject invention will now be described with reference to a preferred embodiment shown in the drawings in which.

DETAILED DESCRIPTION OF A PREFERRED EMBODIMENT

Figure 1:
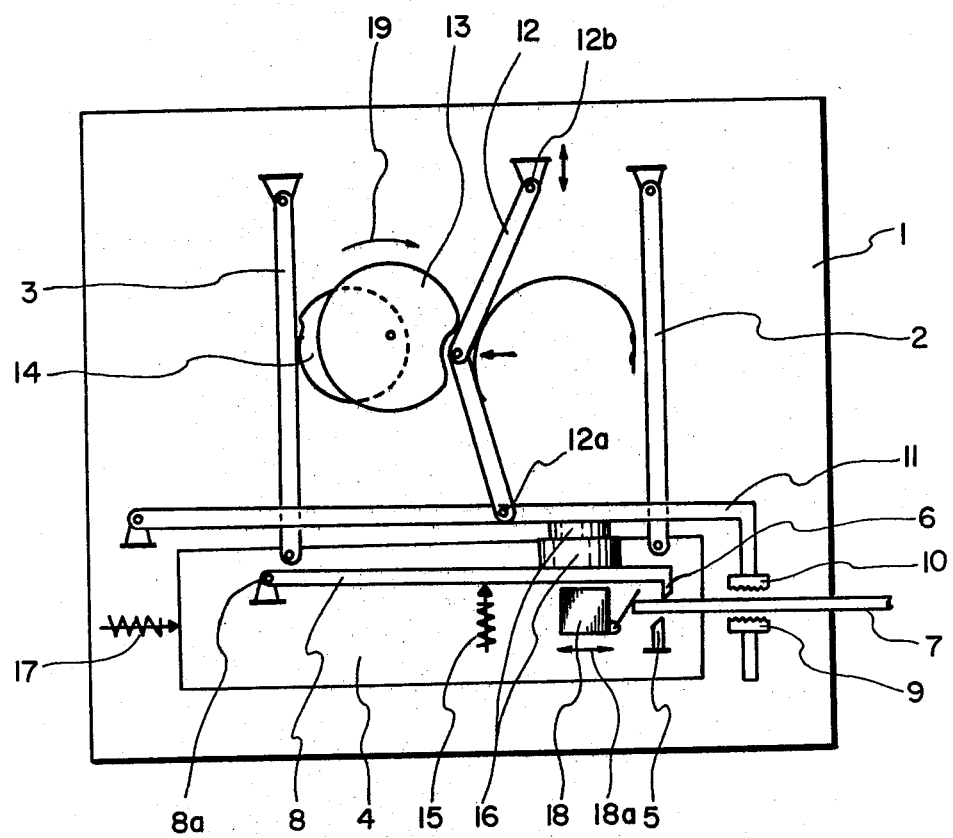
FIG. 1 is a schematic view used to explain the overall design of the tool of the subject invention and its operation.

The design principles of the tool and its operation are described with reference to FIG. 1.

A carriage 4 is suspended via two parallel links 2 and 3 in a housing frame 1. Two blades 5, 6 which are used to cut the insulation of a conductor 7 are coupled to carriage 4. Blade 5 is fixedly connected with carriage 4, whereas the other blade 6 is mounted on a blade lever 8 one end 8a of which is pivotally attached to carriage 4. Two clamping jaws 9 and 10 are mounted on housing frame 1. One of the clamping jaws 9 is fixedly mounted on the frame, whereas the other one 10 is movably joined with housing frame 1 by means of a clamping lever 11. One end 12a of a toggle joint 12 is attached to clamping lever 11. The other end 12b of toggle joint 12 is pivotally attached to housing frame 1. Two cams 13 and 14 driven by a motor not shown in the drawings are provided between toggle joint 12 and the one parallel link 3. One of the cams is termed clamping cam 13, and the other, stripping cam 14. Clamping cam 13 serves to expand toggle joint 12, whereas stripping cam 14 is used to move carriage 4. Lever 8 is biased against clamping lever 11 by means of a compression spring 15 so that lever 8 follows the vertical motion of lever 11. In FIG. 1 clamping lever 11 bearing against lever 8 is indicated by thrust members 16, one of which is joined with clamping lever 11 and the other one with blade lever 8. The thrust members can be moved horizontally with respect to each other. Compression spring 17 acts upon carriage 4 and tends to shift it to the right as far as a shift to the right side is allowed by stripping cam 14. A switch 18 is mounted in carriage 4; switch 18 is actuated by a conductor 7 inserted into the tool and energizes the motor for executing a full operational cycle of the tool.

The following is a description of the operation of the tool with reference to FIG. 1. The scheme of FIG. 1 shows the tool in a position in which the conductor to be stripped can be passed between clamping jaws 9 and 10 and between blades 5 and 6. This is the position which the tool assumes when the stripped conductor is removed from the tool. Therefore this position is termed "releasing position". In the releasing position, carriage 4 is in the rightmost position, and toggle joint 12 is in the position of maximum bending.

When a conductor 7 is passed between clamping jaws 9 and 10 and opened blades 5 and 6, the end of the conductor hits switch 18 which energizes a motor through leads not shown in the drawings. The motor moves the two cams 13 and 14, which are mounted on a common shaft, and rotates the cams into the direction of arrow 19.

Thus, first of all toggle joint 12 is transferred into the straight position. During this expansion of toggle joint 12, stripping cam 14 does not yet move the associated parallel link 3. By expanding toggle joint 12, clamping lever 11 and, hence, blade lever 8 are depressed. Conductor 7 is clamped between the two clamping jaws 9 and 10, and the two blades 5 and 6 cut into the insulation of the conductor. Clamping jaws 9 and 10 move along with blades 5 and 6 and there is no interference from cutting into the insulating material when the clamping has not yet been completed, because in this part of the operational cycle, no axial forces act upon the conductor.

A slight tension force or compression force exerted by the person inserting the conductor is balanced by the blades 5, 6 cutting into the insulation. Once the insulation of conductor 7 has been fully cut and the clamping jaws 9, 10 keep the conductor in its position, stripping cam 14 acts upon parallel link 3 so that the force exerted by compression spring 17 is overcome, and carriage 4 is shifted to the left. During this motion of carriage 4, blades 5, 6 remain in the insulating material of conductor 7. This is possible, because clamping cam 13 keeps toggle joint 12 in the almost straight position. When carriage 4 moves, lever 8 moves along with it axially relative to lever 11. As indicated above, two thrust members 16 are shown in the drawings to illustrate the motion. However, the thrust members are not employed in the tool shown in the other figures and were used only for purposes of explanation.

By retracting the carriage (movement to the left in FIG. 1), the cut insulation is drawn from conductor 7 by the advancing blades 5, 6. The insulation can drop downward into a collecting receptacle or may be allowed to fall out of the tool through an opening.

By continuing the rotation of the two cams 13 and 14 in the direction of arrow 19, the clamping engagement is released and the two blades 5 and 6 are retracted. Immediately afterwards, carriage 4 is returned to the original position. The stripped conductor 7 can be removed from the tool and a new conductor can be inserted.

In order to use the tool for stripping the insulation from conductors of various thicknesses, the minimum distances between blades 5 and 6 and between clamping jaws 9 and 10 must be adjustable. For this purpose, toggle joint 12 is supported on an eccentric shaft in housing frame 1, as described in detail below. In order to adjust the length of the stripped insulating material, switch 18 can be shifted on carriage 4 as shown schematically by arrow 18a. This arrangement is described below.

Figure 2:
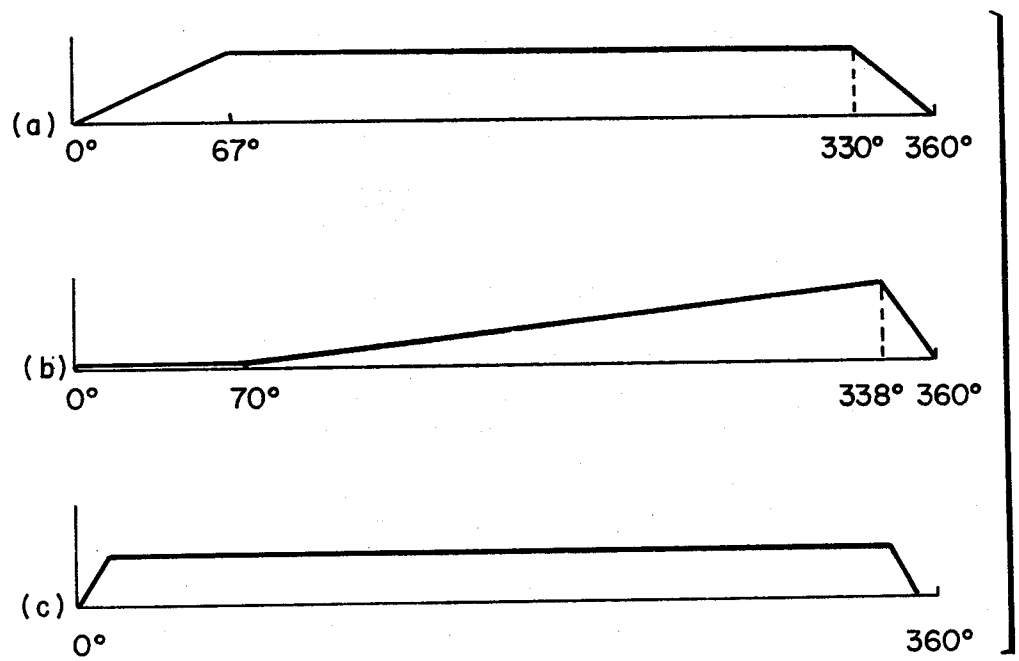
FIGS. 2a - 2c are the control curves of clamping cam, stripping cam, and switching cam, respectively.
Figure 3:
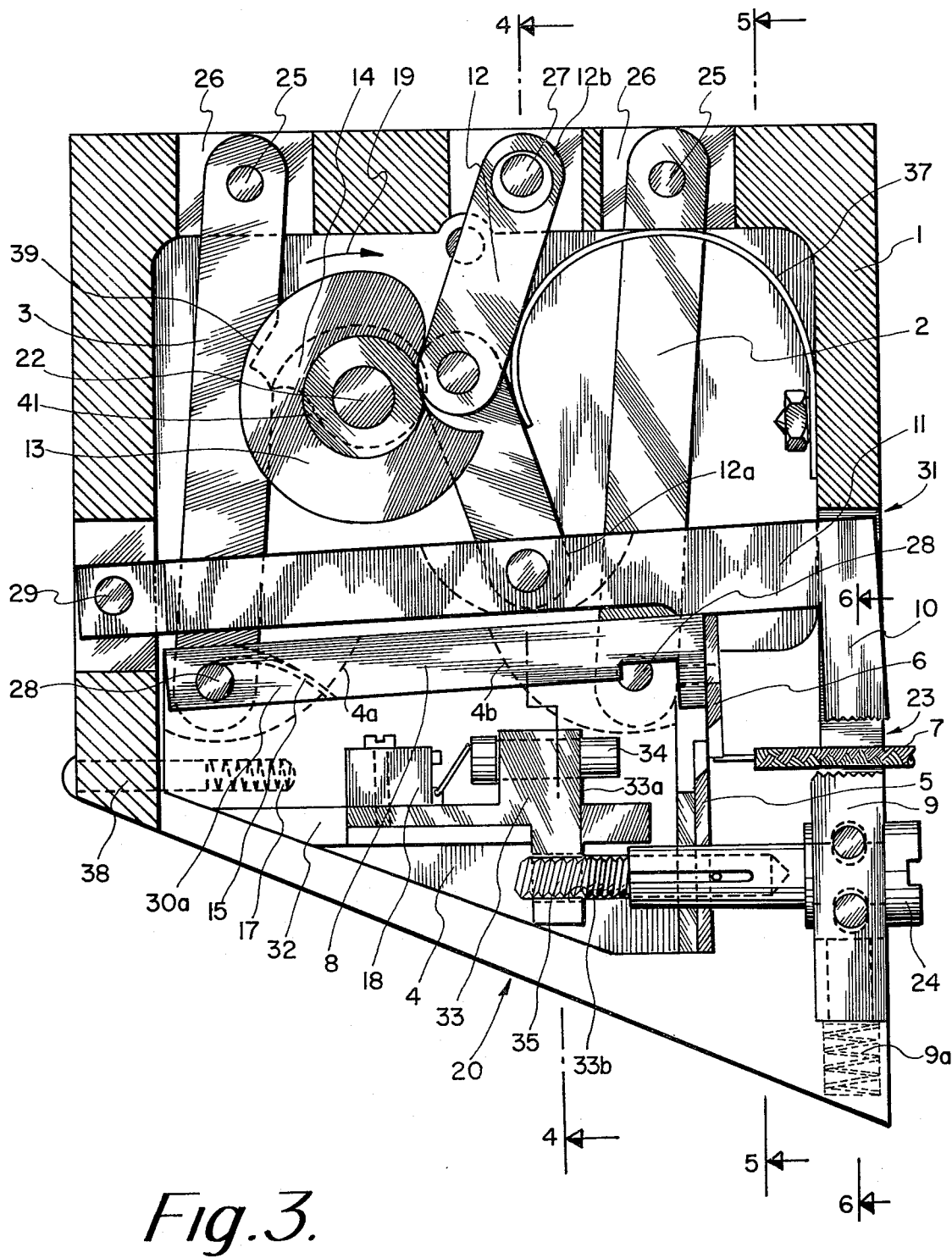
FIG. 3 is a side view of the tool with the side wall removed.

FIG. 2 shows the curves a, b, c depicting the control features of clamping cam 13, stripping cam 14, and switching cam 41, respectively, to illustrate the above-described operational cycle. The curves refer to a full rotation of clamping cam 13, stripping cam 14, and an additional switching cam 41 (FIG. 3). It follows from a comparison of FIGS. 2a and 2b that the motion of carriage 4 starts only once conductor 7 has been fully clamped and that carriage 4 is returned to the releasing position once conductor 7 is no longer clamped. The additional switching cam 41 cooperates with the switch shown in FIG. 8, with the switch de-energizing the tool after one full revolution of the cams.

Figure 5:
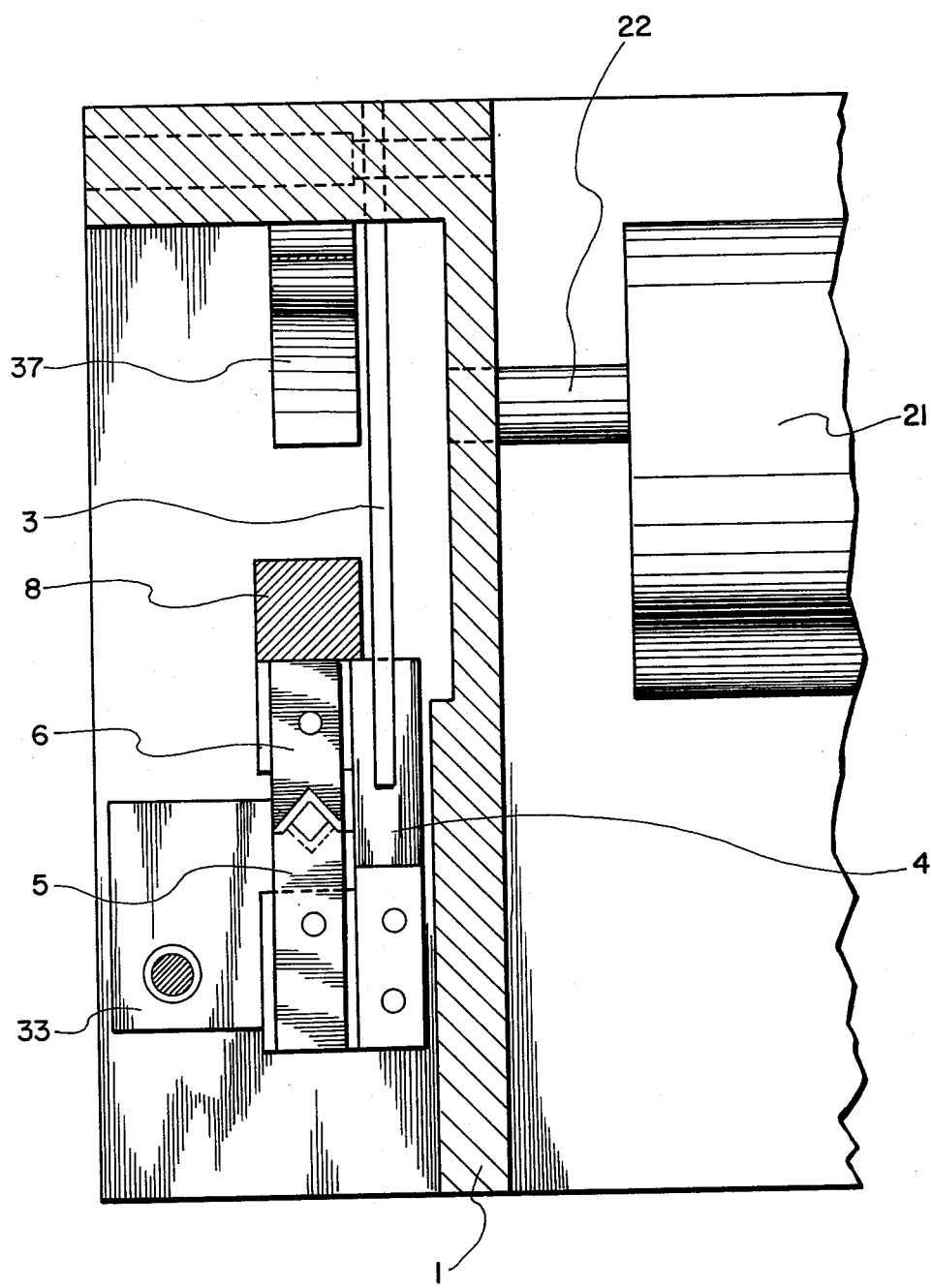
FIG. 5 is another cross sectional view along line V—V of FIG. 3.
Figure 6:
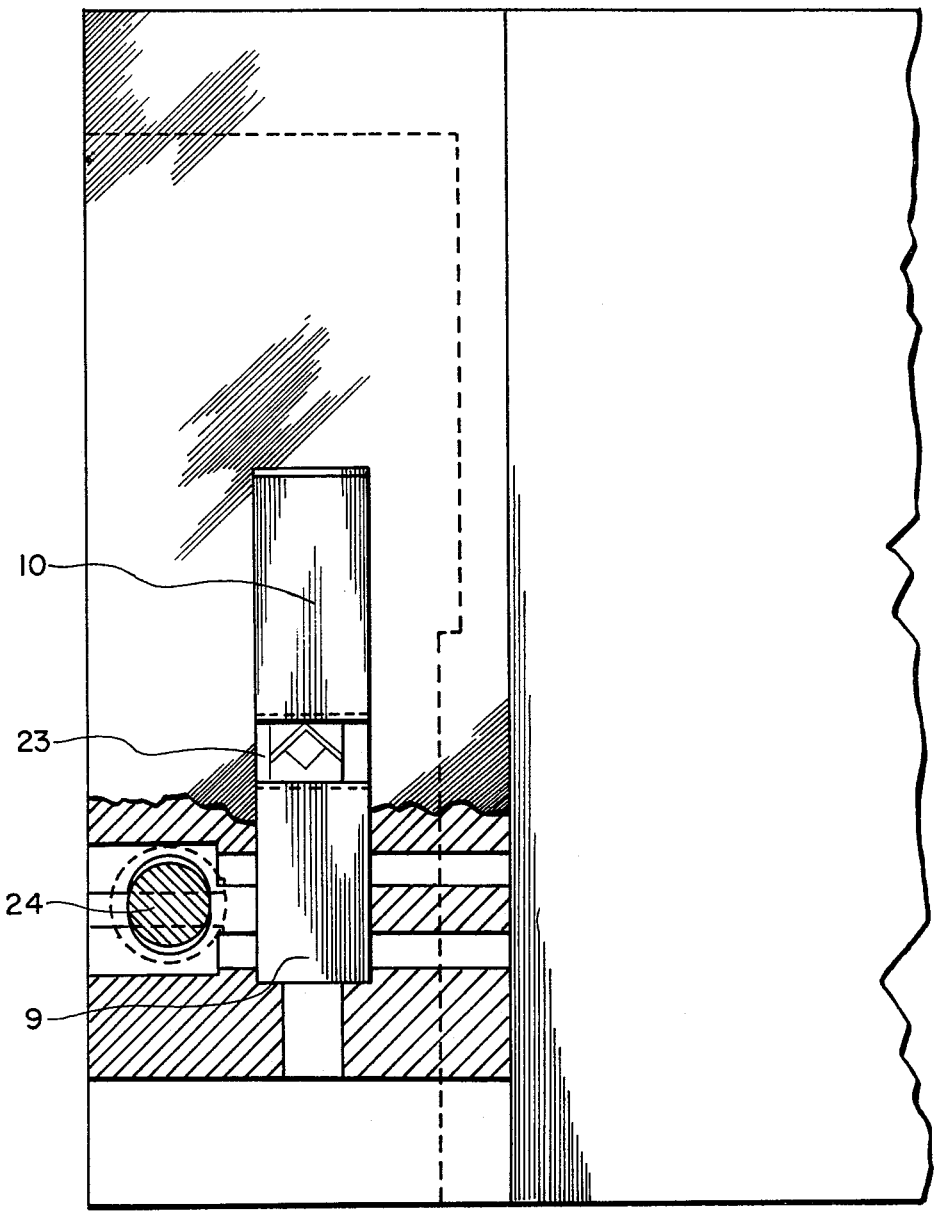
FIG. 6 is a front view of a section of the tool with part of the front plate removed.
Figure 7:
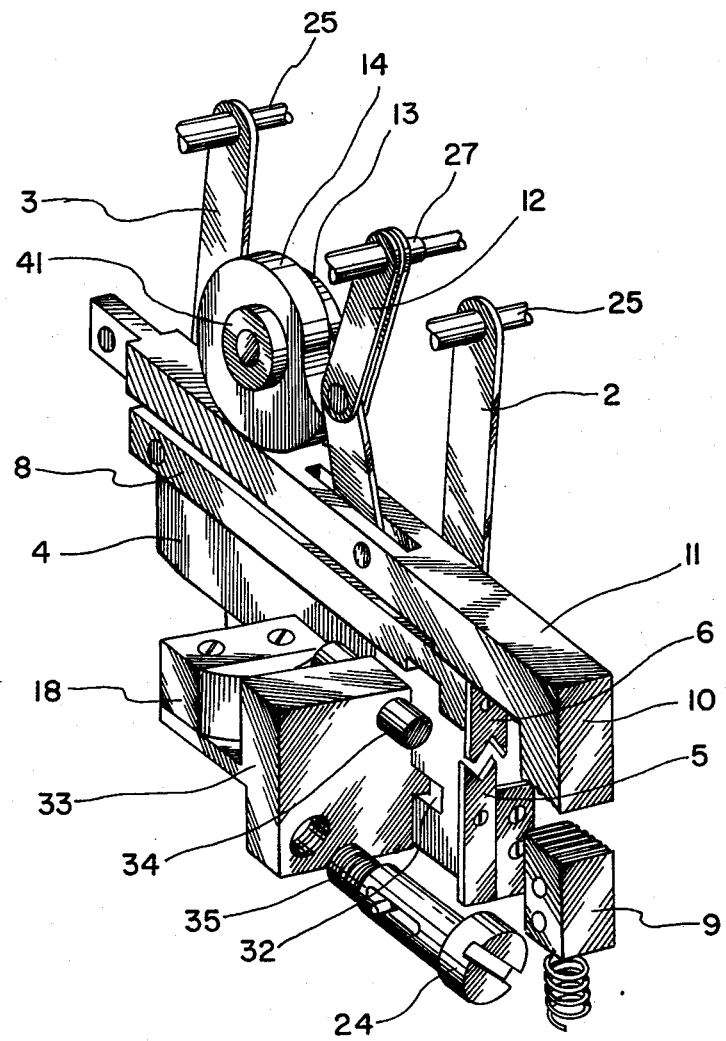
FIG. 7 is a perspective view of the moving components of the tool.

The tool is provided with an elongated housing having an inclined base plate 20. For purpose of clearly showing the components of the tool, the tool is depicted in a tilted position in the drawings, whereas, during its operation, the tool actually rests with its base plate 20 on a table. This configuration was adopted so that conductor 7 can be inserted into the tool from above and from the side The tool is divided into the two sections by housing frame 1 (see FIG. 5). The right section of the housing encloses a gear motor 21 whose driving shaft 22 has a bearing in the housing frame and carries the cams. The components moved by cams 13, 14 are disposed in the left section of the housing. The front plate of this section comprises the entry opening 23 for the conductor 7 and an adjustment knob 24 used to adjust the conductor length to be stripped from its insulation.

Figure 4:
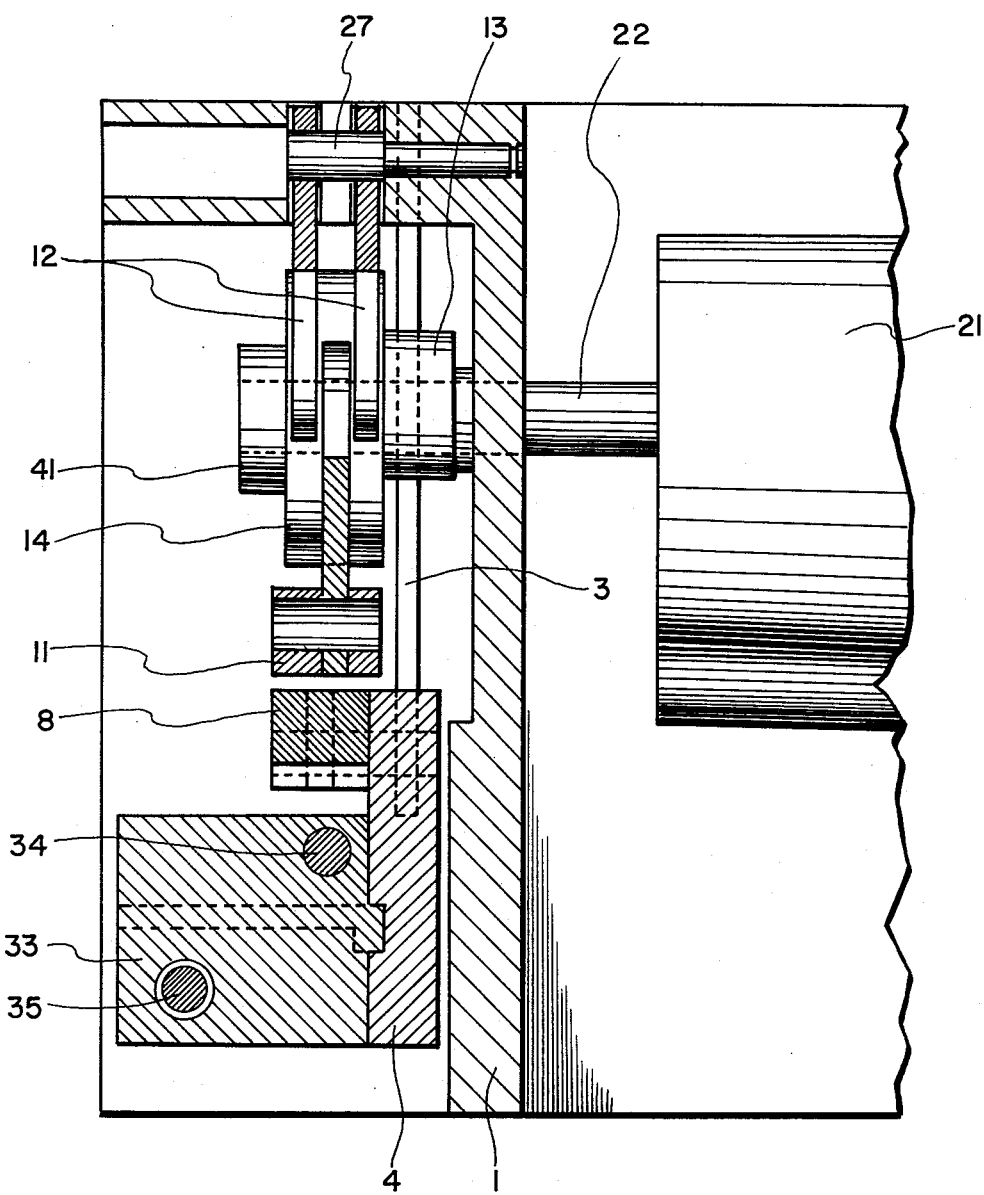
FIG. 4 is a cross sectional view along line IV–IV of FIG. 3.

The two parallel links 2 and 3 and toggle joint 12 are suspended in the upper part of housing frame 1. Each of the parallel links 2 and 3 is formed by a strap which can swing freely around a pin 25 disposed in a recess 26 in housing frame 1. The portion of toggle joint 12 suspended in housing frame 1 consists of two straps connected through a joint between which a third strap forming the lower joint section is inserted. As shown in FIGS. 3 and 4, the upper portion of toggle joint 12 is supported by an eccentric shaft 27 in housing frame 1 so that the maximum deflection of toggle joint 12 can be adjusted with the aid of eccentric shaft 27.

Carriage 4 is suspended on the two parallel links 2 and 3. The two straps, which form parallel links 2 and 3, are inserted in slit-like recesses 4a, 4b in carriage 4 and pivotally supported by pins 28. By guiding the straps of parallel links 2 and 3 in the slit-like recesses 4a, 4b in housing frame 1 as well as in carriage 4, the lateral motion of carriage 4 is restricted. In the same manner, the lower joint section 12a of toggle joint 12 is pivotally supported on clamping lever 11. The left end of clamping lever 11 is supported by a pin 29 disposed in the rear section of housing frame 1. Pin 28, which serves to pivotally support link 3 on carriage 4, is also the supporting means for blade lever 8. Compression spring 15, which keeps lever 8 bearing against clamping lever 11, is provided in a recess 30 in blade lever 8. Clamping lever 11 is substantially L-shaped and protrudes with its short leg into an opening 31 in the front plate of the housing. The "fixed" clamping jaw 9 is inserted in the lower part of opening 31. The lower clamping jaw is mounted in a spring-loaded position, such spring-loaded supporting means 9a being provided for the purpose of preventing excessive clamping of conductor 7. When the width to which blades 5, 6 can be opened is adjusted with the aid of eccentric shaft 27 of toggle joint 12 (to adapt the tool to conductors of different thicknesses), a separate adjustment to the different thicknesses of the insulating material need not be made owing to the spring-loaded supporting means.

A supporting bracket 33 is guided in a longitudinal groove 32 on carriage 4. Switch 18 is mounted on supporting bracket 33. Supporting bracket 33 has a vertical section 33a which, in regard to blades 5, 6, is located before switch 18 and in which a bolt 34 movable in horizontal direction is guided. The vertical section prevents cut sections of insulating material from falling into the area of the switch and from disturbing its proper functioning. Furthermore, supporting bracket 33 is provided with a bore 33b having a thread into which a spindle 35 is screwed. Spindle 35 is mounted in the shaft of adjustment knob 24 and can be shifted in longitudinal direction. Adjustment knob 24 is mounted in the front plate of the housing and serves to effect the longitudinal adjustment of supporting bracket 33 on carriage 4, so that the length of the insulating section to be stripped from conductor 7 can be adjusted. Since carriage 4 and, along with it, supporting bracket 33, execute slight vertical lifting movements as a consequence of the motion of parallel links 2 and 3, adjustment knob 24 is mounted in the front plate of the housing so that the knob can follow the lifting movements. The side wall of the housing, which was cut off in FIG. 3, is mounted close to supporting bracket 33 so that an additional lateral guiding of supporting bracket 33 is not required.

Fixed blade 5 is attached with screws to the front face of carriage 4. The movable blade 6 is attached with screws to the front face of blade 8. The two blades 5 and 6 have V- shaped cutting edges between which the conductor to be stripped is inserted.

For the purpose of having toggle joint 12 always bearing against clamping cam 13, a leaf spring 37 (FIG. 5) resting on toggle joint 12 is provided. Compression spring 17 is inserted into a recess in carriage 4 and bears on the rear wall of housing frame 1 via a screw 38. Compression spring 17 serves to keep parallel link 3 abutting stripping clamp 14.

FIG. 3 shows the tool in a position in which the insulation of conductor 7 to be stripped was cut and removed but with carriage 4 not yet having returned to the initial position. In the initial position, carriage 4 is in the outermost left zone and toggle joint 12 assumes the position of maximum bending. In this condition, blades 5 and 6 and clamping jaws 9 and 10 are separated so that a conductor 7 to be stripped can be inserted between clamping jaws 9 and 10 and blades 5 and 6 and can be pushed up to bolt 34. Bolt 34 is moved by the conductor toward switch 18 so that the actuating arm of the switch is rotated to the position in which the contacts of the switch are closed. As will be explained below, motor 21 is then energized and the cams are rotated in the direction of arrow 19. The rest of the working cycle was described with reference to FIG. 1 so that no additional explanations need be given at this point. However, it is noted that parallel link 3 is provided with a curved recess 39 with which stripping cam 14 can engage. The curved shape results in a very rapid return motion of carriage 4 after removal of the insulating material.

Figure 8:
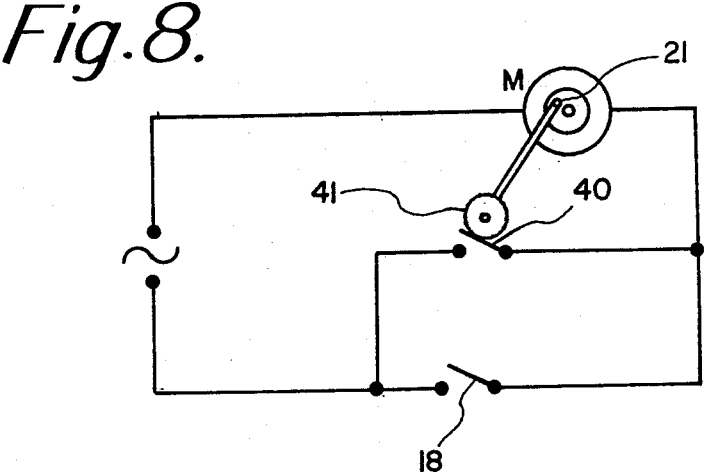
FIG. 8 is a circuit diagram of the motor controlling means of the tool.

The circuit diagram of the motor control system shown in FIG. 8 comprises the aforementioned switch 18 used to energize motor 21, and another switch 40 connected in parallel with switch 18 and actuated by switching cam 41 of motor 21. After switch 18 has been closed once, the motor starts running and closes switch 40 through switching cam 41. Thus, motor 21 remains energized until switching cam 41 interrupts switch 40. Switch 40 is disconnected after completion of a full cycle and after the tool has returned to the releasing position. By closing again switch 18, the motor is switched on to run through a full cycle. The switching cam is fixedly joined with stripping cam 14 and clamping cam 13. The control curve is shown in FIG. 2.

The motor 21 has a torque of 18 Nm. Stripping forces of 120 N and clamping forces of 300 N are obtained with the motor. Wires with conductor cross sections of 0.14–1.5 mm$^2$ can be stripped with the tool. As indicated, differences in the thicknesses of the insulating materials are compensated for by the spring loaded supporting means of the fixed clamping jaw.

It is a particular advantage of the tool that the cut-off pieces of the insulating material do not drop onto switch 118 but are kept away from switch 18 with the aid of supporting bracket 33 and bolt 34. The lower part of the housing can be used as a collecting receptacle for the cut-off insulating material. In a preferred embodiment, the base plate 20 of the housing has an opening through which the stripped pieces of insulation can drop.

What we claim is:

1. A tool for stripping the insulation from electrical conductors, comprising:
   a housing frame;
   a clamping device to clamp the conductor including two clamping jaws movable with respect to each other, one of said clamping jaws being substantially fixedly attached to said housing frame, the other of said clamping jaws being pivotally supported by said housing frame;
   two blades which are movable toward each other for cutting the insulation of the conductor;
   a carriage mounted to said housing by a pair of generally parallel and pivotable links, said carriage movable relative to said clamping device and supporting said blades, one of said blades being substantially fixedly attached to said said carriage, and the other of said blades movably mounted on said carriage;
   a toggle joint operatively connecting said housing frame and said movable clamping jaw; and
   a motor-driven control system for transferring said clamping device and said blades from initial positions in which the conductor is released to a working position in which the conductor is clamped and the blades cut into the insulation, said control system including first and second cams, said first cam acting on said toggle joint and said second cam acting on one of said parallel links, said cams being shaped such that as said toggle joint is expanded said movable clamping jaw and said movable blade are transferred to said working position while said carriage is at rest, and thereafter said carriage is moved while both said clamping device and said blades remain in the working position, and thereafter said movable clamping jaw and said movable blade are returned to the initial position while, at the same time, said carriage is returned.

2. The tool as claimed in claim 1 including, resilient means biasing said movable blade to bear against said movable clamping jaw, second resilient means biasing said toggle joint against said first cam, and third resilient means biasing said carriage toward its rest position when said carriage is in the releasing position.

3. The tool as claimed in claim 1, wherein said toggle joint is mounted on an eccentric shaft at its point of connection to said housing frame, and including means for adjusting said eccentric shaft to thereby accommodate various thicknesses of insulated electrical conductors.

4. The tool as claimed in claim 3, wherein said fixed clamping jaw includes means for spring loading said fixed jaw.

5. A tool for stripping the insulation from an electrical conductor, comprising:
   a frame;
   a clamping device connected to said frame to clamp the conductor;
   two blades, at least one being movable toward the other for cutting the insulation of the conductor;
   a carriage supporting said blades and movably mounted to said frame and relative to said clamping device by a pair of generally parallel and pivotable links;
   a toggle joint connected to said frame and cooperating with said clamping device and said one blade to transfer said clamping device and said one blade from an initial conductor-releasing position to a working position; and
   a motor-driven control system including rotatable cam meanss cooperating with said toggle joint and at least one of said parallel links, said cam means being configured such that as said toggle joint is expanded said clamping device and said one blade are transferred to said working position while said carriage is at rest, and thereafter said carriage is moved while both said clamping device and said one blade remain in the working position, and thereafter said clamping device and said one blade are returned to the initial position while, at the same time, said carriage is returned.

6. The tool as claimed in claim 5, wherein said toggle joint is mounted to said frame on an eccentric shaft, and means are connected to said frame for adjusting said eccentric shaft to thereby accommodate various thicknesses of insulated electrical conductors.

7. The tool as claimed in claim 5, including an electrical switch mounted on said carriage with which said motor can be energized by actuation of said switch when an insulated electrical conductor is inserted into the tool, said switch being movably mounted on said carriage to vary the distance between said switch and said blades for the purpose of adjusting the length of insulation to be stripped from the inserted conductor.

* * * * *